(12) United States Patent
van Rietschote et al.

(10) Patent No.: US 8,516,470 B1
(45) Date of Patent: Aug. 20, 2013

(54) VERSION UPGRADE VIA VIRAL INFECTION

(75) Inventors: Hans F. van Rietschote, Sunnyvale, CA (US); Marc P. Kwiatkowski, San Jose, CA (US); Mahesh Joshi, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 2101 days.

(21) Appl. No.: 10/320,015

(22) Filed: Dec. 16, 2002

(51) Int. Cl.
*G06F 9/44* (2006.01)

(52) U.S. Cl.
USPC .......................................................... 717/168

(58) Field of Classification Search
USPC .................................................. 717/120, 168
See application file for complete search history.

(56) References Cited

U.S. PATENT DOCUMENTS

| | | | |
|---|---|---|---|
| 5,557,798 A | 9/1996 | Skeen et al. | |
| 5,771,354 A | 6/1998 | Crawford | |
| 5,884,308 A * | 3/1999 | Foulston | 707/8 |
| 6,038,601 A | 3/2000 | Lambert et al. | |
| 6,324,587 B1 * | 11/2001 | Trenbeath et al. | 719/310 |
| 6,353,926 B1 | 3/2002 | Parthesarathy et al. | |
| 6,411,967 B1 * | 6/2002 | Van Renesse | 707/201 |
| 6,418,555 B2 | 7/2002 | Mohammed | |
| 6,425,126 B1 | 7/2002 | Branson et al. | |
| 6,457,076 B1 | 9/2002 | Cheng et al. | |
| 6,643,688 B1 * | 11/2003 | Fuisz | 709/206 |
| 6,768,740 B1 * | 7/2004 | Perlman et al. | 370/392 |
| 6,944,642 B1 | 9/2005 | Hopmann et al. | |
| 7,086,050 B2 * | 8/2006 | Barton et al. | 717/173 |
| 2001/0032253 A1 * | 10/2001 | Duxbury | 709/218 |
| 2001/0039565 A1 * | 11/2001 | Gupta | 709/203 |
| 2002/0013831 A1 * | 1/2002 | Astala et al. | 709/220 |
| 2002/0016959 A1 * | 2/2002 | Barton et al. | 717/178 |
| 2003/0074367 A1 * | 4/2003 | Kaler et al. | 707/102 |
| 2003/0182319 A1 | 9/2003 | Morrison | |
| 2004/0019640 A1 | 1/2004 | Bartram et al. | |
| 2004/0044702 A1 * | 3/2004 | Ferreira Alves et al. | 707/203 |

OTHER PUBLICATIONS

"Times Consistency for Shared Distrubuted Objects", Torres-Rojas et al., May 1999, Proceedings of the 18th annual ACM symposium of Principle of distributed computing, pp. 163-172.*

"Concurrent Reading and writing of Clocks", Leslie Lamport, ACM Transactions on Computer Systems, vol. 8, No. 4, Nov. 1990, p. 305-310.*

(Continued)

*Primary Examiner* — Philip Wang

(74) *Attorney, Agent, or Firm* — Wilmer Cutler Pickering Hale and Dorr LLP

(57) ABSTRACT

A system comprises a plurality of nodes coupled via a network. The plurality of nodes are configured to communicate by transmitting and receiving messages between the plurality of nodes. Each message comprises a first version identifier indicative of a first version of an object in a first node of the plurality of nodes, wherein the first node is the transmitter of the message. A second node of the plurality of nodes receives the message, and is configured to upgrade to the first version of the object responsive to the first version identifier indicating that the first version is newer than a second version in the second node (as indicated by a second version identifier in the second node). The second node is configured to include the first version identifier in subsequent messages transmitted by the second node.

20 Claims, 6 Drawing Sheets

(56) References Cited

OTHER PUBLICATIONS

Leslie Lamport, Massachusetts Computer Associates, Inc., "Time, Clocks, and the Ordering of Events in a Distributed System," Communications of the ACM, Jul. 1978, vol. 21, No. 7, pp. 558-565.

Vincent D. Park and M. Scott Corson, Naval Research Laboratory, Univ. of Maryland, "A Highly Adaptive Distributed Routing Algorithm for Mobile Wireless Networks," IEEE, 1997, 9 pages.

Hung-Chang Hsiao and Chung-Ta King, Dept. of Computer Science, National Tsing Hua Univ., "Modeling and Evaluating Peer-to-Peer Storage Architectures," IEEE, 2002, 6 pages.

Rob R. Hoogerwoord, "Leslie Lamport's Logical Clocks: a tutorial," Jan. 29, 2002, pp. 1-26.

Federal Information, Processing Standards Publication 180-I, "Secure Hash Standard," Apr. 17, 1995, 17 pages.

TIBCO Software, Inc., "TIBCO Messaging Solutions," 2002, 2 pages.

BitMover, Inc., "BitKeeper, Source Management," 1997-2001, 42 pages.

CollabNet, Inc., "CVS—Concurrent Versions System v1.11.2," 1999-2002, 247 pages.

\* cited by examiner

| Case | Upgrade Response |
|---|---|
| S1=S2, LLC1=LLC2 | Same Version, No Update |
| S1=S2, LLC1>LLC2 | Node Has Newer Version But is Same Content, No Update |
| S1=S2, LLC1<LLC2 | Transmitting Node Has Newer Version But is Same Content, Update Version ID But Not Content |
| S1!=S2, LLC1=LLC2 | Two Conflicting Versions of Object, Update Version ID and Content if S2>S1, Resolve Conflict |
| S1!=S2, LLC1>LLC2 | Transmitting Node Has Older Version, No Update |
| S1!=S2, LLC1<LLC2 | Transmitting Node Has Newer Version, Update Version ID and Content |

Fig. 6

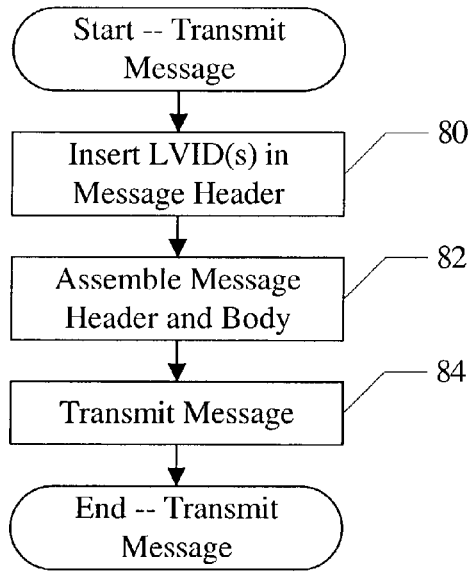

Fig. 7

VERSION UPGRADE VIA VIRAL INFECTION

BACKGROUND OF THE INVENTION

1. Field of the Invention

This invention is related to the management of objects in a networked system and, more particularly, to upgrading versions of the objects in the system.

2. Description of the Related Art

Various models are used to link a set of nodes (e.g. computer systems) into a networked system. For example, the client-server model defines a central authority (a server) which manages various objects shared by the nodes in the computer system. Another model is a peer-to-peer network, in which the nodes may typically have equivalent responsibilities and capabilities. In some cases, the nodes may acquire various responsibilities/capabilities in the system and release the responsibilities/capabilities as they see fit.

Various objects may be shared among the nodes in a peer-to-peer network. That is, various nodes in the peer-to-peer network may have copies of the objects. If an object may be updated, then a mechanism for propagating new versions of the object is needed. Typically, networked systems have employed one of several mechanisms for version propagation: manual checking, polling, or broadcasting.

With manual checking, a system administrator checks for new versions of objects, and manually propagates the new versions to the nodes. Since manual checking involves humans, the propagation of the new versions may be delayed in time. Additionally, the timing of update propagation may be inconsistent based on how often the system administrator actually checks for new versions.

In a polling mechanism, each node polls other nodes (e.g. server nodes, or each other node or a subset of other nodes in a peer-to-peer system) to detect new versions. While version propagation may be more rapid than the manual checking method in some cases, the polling mechanism may generate a relatively large amount of communication traffic between the nodes, which may impact the transmission of other traffic.

In a broadcast mechanism, the node with a newer version broadcasts an indication of the new version to other nodes. The broadcast mechanism may involve less communication traffic between the nodes. However, if a given node is "down" (not operating on the network) at the time of the broadcast, that node may not receive the new version.

SUMMARY OF THE INVENTION

In one embodiment, a system comprises a plurality of nodes coupled via a network. The plurality of nodes are configured to communicate by transmitting and receiving messages between the plurality of nodes. Each message comprises a first version identifier indicative of a first version of an object in a first node of the plurality of nodes, wherein the first node is the transmitter of the message. In some embodiments, each message may include additional version identifiers corresponding to versions of other objects in the first node. A second node of the plurality of nodes receives the message, and is configured to upgrade to the first version of the object responsive to the first version identifier indicating that the first version is newer than a second version in the second node (as indicated by a second version identifier in the second node). The second node is configured to include the first version identifier in subsequent messages transmitted by the second node. A method and a computer accessible medium comprising software executable on one of the nodes are also contemplated.

BRIEF DESCRIPTION OF THE DRAWINGS

The following detailed description makes reference to the accompanying drawings, which are now briefly described.

FIG. 6 is a table illustrating one embodiment of scenarios that may occur between a local version identifier and a version identifier from a message.

FIG. 7 is a flowchart illustrating operation of one embodiment of a node for transmitting a message.

Figure 1:
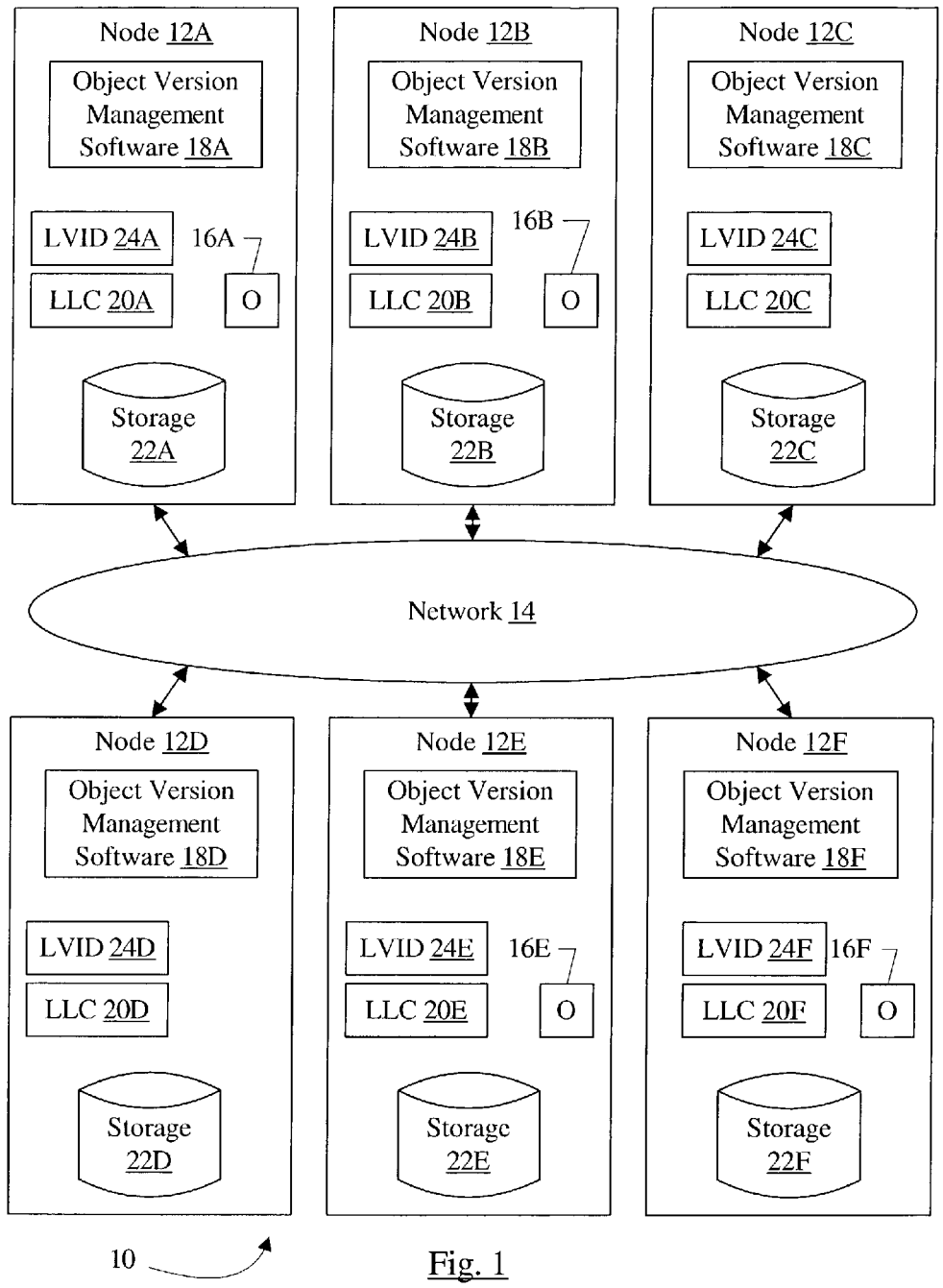
FIG. 1 is a block diagram of one embodiment of a networked system of nodes.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of a system 10 including a plurality of nodes 12A-12F interconnected via a network 14 is shown. One or more of the nodes 12A-12F may have a version of an object O (e.g. reference numerals 16A, 16B, 16E, and 16F illustrated in nodes 12A, 12B, 12E, and 12F, respectively in FIG. 1). The versions in various nodes 12A-12F may be the same version, or one or more nodes 12A-12F may have different versions if a node or nodes has updated the object O.

Each of the nodes 12A-12F is configured to maintain one or more version identifiers (Version IDs). These version IDs are referred to herein as local version IDs (LVIDs) (e.g. LVIDs 24A-24F in FIG. 1). An LVID is the version ID for an object that identifies the version of the object within the node. Each LVID in a given node corresponds to a different object in that node.

The nodes 12A-12F communicate with each other using messages. Generally, a message may include any communication between two or more nodes 12A-12F. One node 12A-12F may transmit the message, and one or more nodes 12A-12F may receive the message. For example, messages may include packets transmitted between the nodes 12A-12F, with the body of the packet including the substance of the message.

Each node 12A-12F is configured to include at least one LVID 24A-24F from that node 12A-12F in messages that the node transmits. In some embodiments, multiple LVIDs may be included in each message (e.g. up to one LVID for each object of which the transmitting node has a version). A receiving node 12A-12F (a node that receives the message) is configured to compare the version ID(s) in the message to corresponding LVID(s) for the same object(s) in the receiving node. If the receiving node detects that the transmitting node has a newer version of an object than the receiving node, the receiving node may upgrade to the newer version. The receiving node also includes its LVID(s) in messages that the receiving node transmits. Thus, after an upgrade induced by receiving a newer version ID in a message, the receiving node includes the version ID of the newer version in subsequent messages transmitted by the receiving node. In this manner, other nodes 12A-12F may be informed of the newer version by receiving messages from the receiving node. Version updates may spread from node to node in a manner similar to a virus. Over time, various nodes 12A-12F may become informed of the new version. If many messages are passed between nodes, the new version may spread rapidly. Even if a node 12A-12F is "down" (e.g. powered off, or disconnected from the network intentionally or unintentionally) when a new version of an object becomes available, the node 12A-12F may be informed of the new version when it comes back "up" by receiving the version ID indicating the new version in a message. Furthermore, traffic may not be increased, in some embodiments, to inform other nodes 12A-12F of new versions since the new version may be propagated using other messages.

In different types of systems 10, a node may obtain the content of a new version of the object in a variety of fashions. For example, in a peer-to-peer system, the content may be obtained from the node that generated the version. In a client-server system, the content may be obtained from the server of that object. Any mechanism for obtaining the content of the object may be used.

In some cases, the new version of the object may have the same content as the current version in the receiving node. For example, if a previous version is reverted to (e.g. due to a conflict with another version, or because there is a problem with a newer version, etc.), a node which still has the previous version as its current version has the same content for the object as the newer version. In such cases, upgrading to the newer version may include updating the LVID to the new version ID. In other cases, in which the content is different between the current version in the receiving node and the new version, the content of the object may be updated. Generally, as used herein, "upgrading" to a new version refers to using the new version as the current version of the object. Upgrading may include changing the version ID for the object, and may optionally include obtaining new content for the object. It is noted that the content of an object may include data (e.g. storage data or other data for the object) or instructions (e.g. a code sequence, program, etc.). In one embodiment, the object version management software 18A-18F included in the respective nodes 12A-12F includes instructions which, when executed, cause LVIDs to be included in messages transmitted by the respective nodes 12A-12F and which compare version IDs in messages received by the respective nodes 12A-12F to corresponding LVIDs and upgrade versions if a newer version is available.

In one embodiment, the nodes 12A-12F that update an object (e.g. the object O) are configured to generate new versions of the object. Additionally, in some embodiments, any of the nodes 12A-12F may detect a conflict between versions of the object. For example, when a given node 12A-12F receives a message that includes a version ID for the object O, the given node 12A-12F may detect a conflict between the updated version and the current version in that given node 12A-12F (in some embodiments). Additionally, when the conflict is resolved, any of the nodes 12A-12F is configured to propagate an indication of the resolution to other nodes 12A-12F. The nodes 12A-12F may use the indication of resolution to prevent reporting (or raising) the conflict again if another node 12A-12F detects the same conflict.

In one embodiment, when a conflict is detected between two versions of an object, resolving the conflict may involve selecting one of the versions to be the "winning version" (the version whose contents are retained). The winning version may be indicated as a new version of the object. The "losing version" (the version whose contents are discarded) may also be noted so that the conflict between the winning version and the losing version may not be reasserted. The winning version may be selected arbitrarily, for example, but in a consistent fashion so that each node 12A-12F may generate the same selection if that node resolves the conflict. For example, the older or the newer of the versions may be selected. Alternatively, user intervention may be used to resolve some conflicts, and the user may specify the winning version.

In one embodiment, if a node 12A-12F updates an object, the object version management software 18A-18F in that node 12A-12F locally generates a new version identifier for the object. That is, the object version management software 18A-18F does not require access to any other node to generate the version identifier. The new version identifier identifies the version uniquely in the system 10. The version identifiers identifying various versions may be compared to detect conflicts.

In one implementation, the version identifiers may include a logical timestamp indicative of the logical time at which an update that caused a new version occurs. Generally, a logical timestamp includes any logical value that permits events in different nodes to be ordered with respect to each other. The logical time may not be correlated to the physical time (or real time) at which the events occur. For example, in one embodiment, the logical timestamps may be Lamport Logical Clock (LLC) timestamps. Each node 12A-12F may maintain an LLC (reference numerals 20A-20F in the nodes 12A-12F, respectively). The LLC may be a value stored in a register within a processor in the node, or in a memory location in a memory system in the node, for example. The value of the LLC 20A-20F in a node 12A-12F at the time a version is generated may be used as the LLC timestamp. The LLC may be changed, such that subsequent events may be viewed as occurring logically after the generation of the version. For example, the LLC may be incremented. Additionally, if a message is received from another node and the LLC timestamp of that message is greater than the current LLC in the node, the node's LLC is advanced to be greater than the LLC timestamp of the message (e.g. the LLC timestamp of the message incremented by one) if the current LLC is not already greater. The LLC timestamps in the version identifiers may be used to compare version identifiers, to determine which version was generated earlier in logical order. The version identifiers may be used to detect conflicting updates and to record resolved conflicts.

Comparisons of LLCs (and LLC timestamps) may result in a first LLC being less than a second LLC, equal to the second LLC, or greater than the LLC. If the first LLC is less than the second LLC, the first LLC is viewed as being earlier in logical time than the second LLC. Similarly, if the first LLC is greater than the second LLC, the first LLC is viewed as being later in logical time than the second LLC. If the first LLC is equal to the second LLC, the same logical time is being expressed by both LLCs. In terms of version IDs, if a first LLC timestamp is less than a second LLC timestamp, the version corresponding to the first LLC timestamp is logically before the version corresponding to the second LLC timestamp. If the first LLC timestamp is greater than the second LLC timestamp, the version corresponding to the first LLC timestamp is logically after the version corresponding to the second LLC timestamp. That is, if the first LLC timestamp is greater than the second LLC timestamp, the version corresponding to the first LLC timestamp is newer than the version corresponding to the second LLC timestamp. The preceding discussion assumes that the LLC is increased to progress logical time. If embodiments employ a decrease in LLC to progress logical time, the opposite numerical interpretations to those presented above may be used to determine the order of versions.

Generally, an object may be any uniquely identifiable and persistent data, copies of which may be maintained by one or more of the nodes 12A-12F. That is, versions of the object may be stored in two or more of the nodes 12A-12F. Several exemplary objects are described below (storage objects, files in a content management system, events in a reliable message system, and workflow objects in a workflow system). The term object will be used for the remainder of the disclosure, and is intended to cover the above examples as well as any other type of object. Object data may include instructions (e.g. if the object is software or a code sequence that forms a portion of some software). A node, as used herein, may include one or more computer systems. A computer system may include one or more processors that execute the instructions comprising the software installed on the computer system, as well as other hardware (e.g. memory, nonvolatile storage devices such as disk drives, other peripherals, etc.). In some implementations, nodes may also include a storage device or devices (e.g. network attached storage (NAS) or storage area network (SAN) devices). The network 14 may include at least communication media between the nodes 12A-12F (e.g. cable, fiber optic, wire, wireless communication, etc.). The network 14 may further include various communication and/or network devices (e.g. routers, switches, firewalls, modems, etc.). In various embodiments, the network 14 may be a wide area network (WAN), local area network (LAN), metropolitan area network (MAN), or combinations of the above.

In some embodiments, objects may be storage objects (e.g. directories and files of a file system implemented across the nodes 12A-12F, or blocks of fixed or variable size if the nodes 12A-12F implement a virtual block storage device for storage objects shared among the nodes 12A-12F). In such embodiments, the system 10 may be a peer-to-peer storage system. The nodes 12A-12F may share all or part of the respective storage devices 22A-22F, and the file system of the storage system may be mapped onto the shared storage. Storage objects may be data or instructions in the peer-to-peer system 10, versions of which may be stored on one or more of the storage devices 22A-22F. That is, the objects 16A, 16B, 16E, and 16F may be storage objects stored on the storage devices 22A, 22B, 22E, and 22F respectively.

In other embodiments, objects may be files in a content management system executing on the peer-to-peer system 10 (e.g. the files may be software, document files such as word processor files or spreadsheets, or displayable content such as web page files). In still other embodiments, the nodes 12A-12F may implement a reliable messaging system. In a reliable messaging system, subscribers may subscribe to an event. Updates to the event may be messages related to the event (e.g. an event may be a package in a package delivery system, and messages may update the progress of the package toward delivery). The reliable messaging system may ensure that the messages are relayed to the subscribers, even if the subscribers are partitioned from the network at the time the message is generated. In yet other embodiments, the nodes 12A-12F may implement a workflow system in which a workflow object is passed from node to node, each of which may update the object to move the workflow object toward completion. For example, a workflow object may be an expense report. The expense report may be generated by the employee who incurred the expense, be approved by the employee's manager, be approved by the human resources department after the manager approves it, and be paid by the accounting department. The employee, the manager, the human resources department, and the accounting department may all access the expense report at different nodes.

It is noted that, while some of the examples mentioned above employ peer to peer networks, other embodiments may employ other types of networks. For example, a client-server network may implement the above described scheme for including version IDs in messages and spreading upgrades, while otherwise operating in a client-server manner.

It is noted that, while 6 nodes are illustrated in FIG. 1, various embodiments may have more or fewer nodes, as desired.

Figure 2:
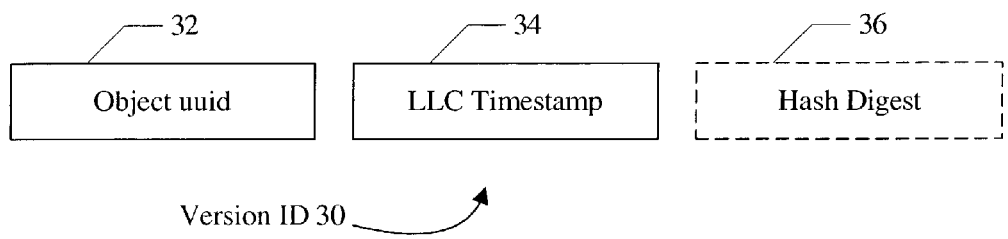
FIG. 2 is a block diagram of one embodiment of a version identifier.

Turning now to FIG. 2, a block diagram of one embodiment of a version identifier (ID) 30 is shown. The LVIDs 24A-24F may be embodiments of the version ID 30. Additionally, the message VIDs 66A-66B in FIG. 4 (described below) may be embodiments of the version ID 30. Generally speaking, a version identifier may be any value or values that uniquely identify a version of an object. In the illustrated embodiment the version ID 30 includes an object identifier 32, an LLC timestamp 34, and an optional hash digest 36.

The object identifier 32 is any value that uniquely identifies a given object among other objects. For example, in FIG. 2, the object identifier 32 may comprise a universally unique identifier (uuid) assigned to the object. A uuid is commonly used on the Internet as an unique identifier. Other embodiments may use any other value (e.g. uniquely assigned names).

The LLC timestamp 34 is the timestamp mentioned above with respect to FIG. 1. The LLC timestamp 34 permits comparison of various version IDs to determine ordering of the versions. That is, the LLC timestamp 34 defines an order among the version IDs, even though the version IDs may have been generated by different nodes. The order may be unambiguous (that is, any node may arrive at the same ordering of a set of version IDs).

The hash digest 36 may be used to detect different versions (as indicated by the LLC timestamps 34 in the respective versions IDs) that actually have the same content. The hash digest 36 may be a hash of the content of the object, and thus if the hash digests are the same then the content may be the same. Any hash algorithm may be used, although in one embodiment the secure hashing algorithm-1 (SHA-1) may be used. The hash digest 36 is optional, and may be eliminated in some embodiments. For example, some embodiments may query a source of an object to determine if the content is the same, when different versions are detected.

One or more "special" version IDs may be defined for use by the nodes 12A-12F in communicating version information among the nodes. For example, a minimum version ID may be used as the parent version for the initial version of an object.

It is noted that the order of values illustrated in FIG. 2 may be varied in other embodiments (e.g. the LLC timestamp 34 may be presented first, followed by the object uuid 32 and the hash digest 36 in either order; or the hash digest 36 may be presented first, followed by the uuid 32 and the LLC timestamp 34 in either order).

The LLC 20A-20F may, in some embodiments, be used by the nodes 12A-12F for ordering other events. Additionally, even if the LLCs 20A-20F are used exclusively for version ID generation, the LLCs in a tree of versions may not be monotonically increasing (e.g. if partitions occur, the LLCs in the different partitions may differ). Accordingly, in this embodiment, a given version of an object may be more fully described using a version descriptor. Generally, a version descriptor comprises one or more version IDs 30.

Figure 3:
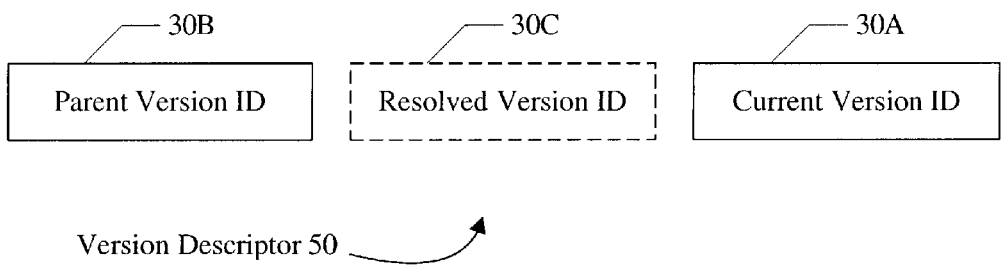
FIG. 3 is a block diagram of one embodiment of a version descriptor.

FIG. 3 is a block diagram of one embodiment of a version descriptor 50. The version descriptor 50 illustrated in FIG. 3 includes at least a current version ID 30A and a parent version ID 30B. Optionally, the version descriptor 50 may include a resolved version ID 30C. Each of the current version ID 30A, the parent version ID 30B, and the resolved version ID 30C may be instantiations of version identifiers 30.

The current version ID 30A is the version ID generated by a node 12A-12F when that node 12A-12F updates the object (thus creating a new version), or is the version ID supplied with the updated object to the node 12A-12F, if the node receives the updated object from another node. Thus, the current version ID 30A is the version ID corresponding to the current version held by the node 12A-12F. That is, the current version ID 30A may be the LVID for the object in the node. The parent version ID 30B is the version ID corresponding to the version of the object from which the current version was derived. That is, the parent version is the version of the object that was modified by a node 12A-12F to create the current version.

The optional resolved version ID 30C may be included in a version descriptor 50 of a version of the object that is created as the resolution of a conflict. That is, when a conflict is resolved, the resolving node 12A-12F may generate a new version ID for the resolved version. The new version ID is used as the current version ID 30A (the LVID) in the version descriptor 50 corresponding to the resolved version. The parent version ID 30B in the version descriptor 50 corresponding to the resolved version may be the version ID of the winning version. The version ID of the losing version may be recorded as the resolved version ID 30C in the version descriptor 50 corresponding to the resolved version. Thus, if another node 12A-12F has a current version equal to the resolved version ID 30C, that node may inhibit raising a conflict for the object (and thus a given conflict may be raised and resolved once even if detected multiple times).

It is noted that the order of version IDs shown in the version descriptor 50 is merely exemplary. Any order of the version IDs may be used.

Figure 4:
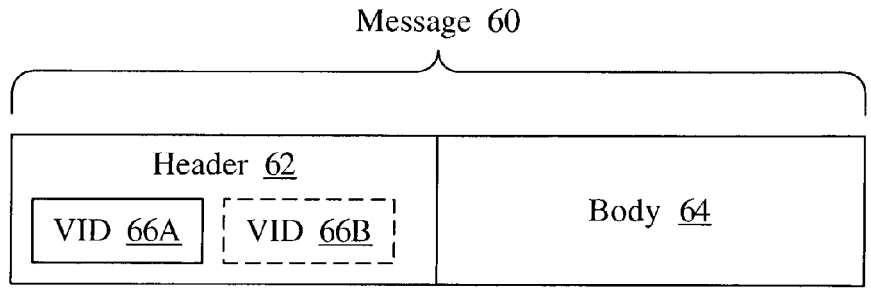
FIG. 4 is a block diagram of one embodiment of a message between nodes.

Turning next to FIG. 4, a block diagram of one embodiment of a message 60 that may be transmitted between the nodes 12A-12F is shown. In the illustrated embodiment, the message 60 includes a header 62 and a body 64. The header 62 includes at least a first version ID (VID) 66A, and may optionally include one or more additional VIDs such as VID 66B. Any number of VIDs 66A-66B may be included in various embodiments.

Generally, the header 62 may include the VIDs 66A-66B. Additionally, the header may include other information (e.g. routing information to cause the message 60 to be routed to one or more receiving nodes, source information identifying the transmitting node, etc.). The body 64 may include the substance of the message (i.e. that which is being communicated by the transmitting node to the receiving node(s)). In particular, the substance of the message may, in some cases, be unrelated to the objects identified by the VIDs 66A-66B. That is, the substance of the message may be a communication which does not refer to the objects (e.g. does not request information or supply information regarding the object and does not affect the status of the object). In some embodiments, a VID 66A-66B may identify a version of the object version management software 18A-18F itself (e.g. the object version management software 18A-18F may be an object or objects). Alternatively, the substance of the message may be related to a subset (one or more) of the objects identified by the VIDs 66A-66B but unrelated to the remaining objects (not included in the subset) identified by the VIDs 66A-66B. The substance of the message may not be a message to upgrade the version of the object(s) identified by the VIDs 66A-66B, in many cases.

In some embodiments, either the header 62 and/or the body 64 may include an LLC timestamp from the transmitting node 12A-12F.

Figure 5:
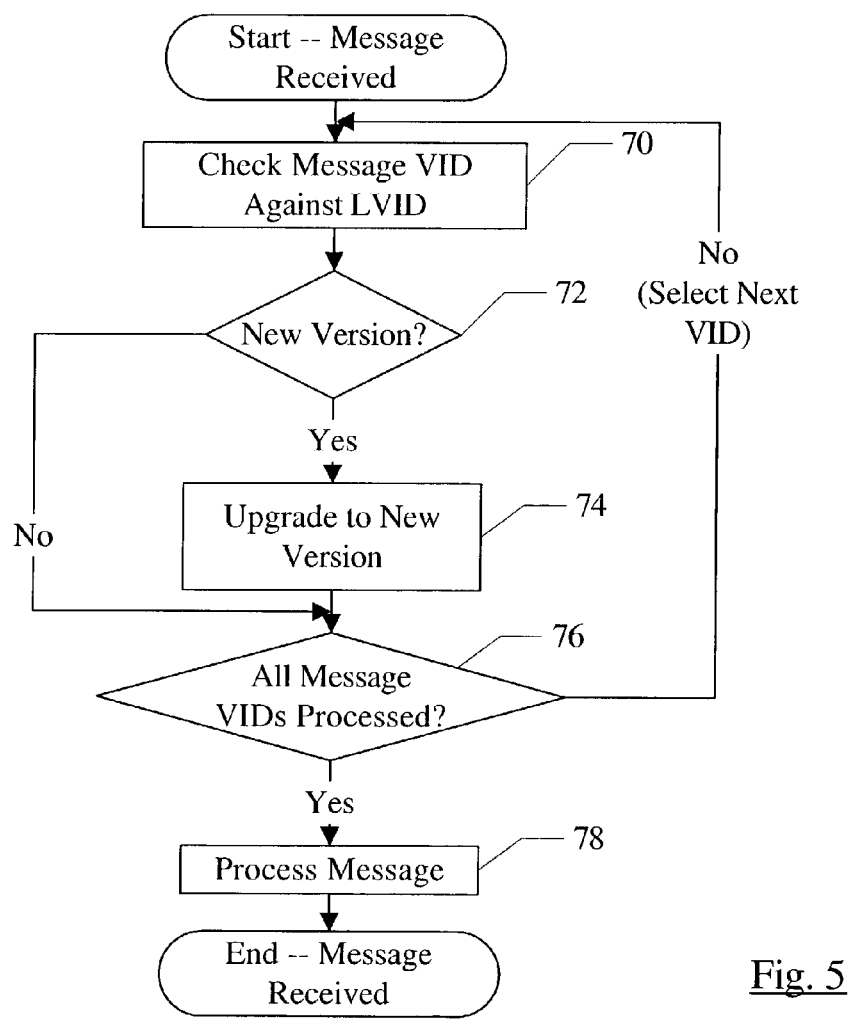
FIG. 5 is a flowchart illustrating operation of one embodiment of a node in response to receiving a message from another node.

FIGS. 5-7 illustrate operation of one embodiment of the object version management software that may be included in each node. That is, each node 12A-12F may include a copy of the object version management software (illustrated as object version management software 18A-18F in FIG. 1) that may operate in the fashion described in FIGS. 5-7 for this embodiment. Thus, the object version management software 18 will be referred to below and it is understood that the copies of the object version management software 18A-18F may each implement the function described. Similarly, the node 12 on which the object version management software 18 is executing may be referred to, and it is understood that the node 12 may generally refer to any node 12A-12F executing its copy of the object version management software 18A-18F. Each of FIGS. 5-7 is representative of one or more instructions in the object version management software 18 which, when executed in a node 12, cause the function illustrated to occur within that node. It is noted that, in other embodiments, a portion or all of the object version management software 18 may be implemented in hardware, if desired.

Turning next to FIG. 5, a flowchart is shown illustrating operation of one embodiment of the object version management software 18 in response to a node 12 receiving a message.

The object version management software 18 selects a VID 66A-66B from the header 62 and checks the VID against the LVID in the node 12 (if any) for the object (block 70). For version ID 30, the object version management software may locate the LVID for which the object identifier field 32 matches the object identifier field 32 in the selected VID 66A-66B. The object version management software 18 compares the LLC timestamps from the LVID and the VID to determine if the VID identifies a newer version than the LVID (and may also compare the hash digests 36 to detect two versions having the same contents). If the object version management software 18 detects that the message VID indicates a newer version than the LVID (decision block 72, "yes" leg), the object version management software 18 may upgrade to the newer version (block 74). In either case, the object version management software 18 may determine if all message VIDs 66A-66B have been processed (decision block 76). If not (decision block 76, "no" leg), the object version management software 18 may select the next message VID 66A-66B and repeat blocks 70-74. Once all the message VIDs 66A-66B have been processed, the object version management software 18 (or alternatively other software in the node 12, not shown) processes the body 64 of the message 60 (block 78).

It is noted that block 78 may be performed prior to blocks 70-76, or during blocks 70-76. Alternatively, block 78 may be performed independently and in parallel with the flowchart of FIG. 5. It is noted that, in embodiments in which at most one VID 66A is included in a message, the decision block 76 may be eliminated.

Turning next to FIG. 6, a table is shown illustrating the operation of blocks 70-74 in greater detail for one embodiment of a version ID 30 as shown in FIG. 2 (including the hash digest 36). In the "Case" column of the table, the symbols S1, S2, LLC1, and LLC2 are used. S1 refers to the hash digest 36 in the LVID for the object. S2 refers to the hash digest 36 in the message VID 66A-66B for the object. Similarly, LLC1 refers to the LLC timestamp 34 from the LVID and LLC2 refers to the LLC timestamp 34 from the message VID 66A-66B. The table of FIG. 6 presumes that the LVID and the message VID identify the same object (e.g. that the object identifier fields 32 of the LVID 24 and the VID 66A-66B have been detected as matching). The transmitting node referred to below is the node that transmits the message 60 that includes the message VIDs 66A-66B. The receiving node is a node that receives the message 60 that includes the message VIDs 66A-66B. The "Upgrade Response" column of the table describes what upgrade is performed in the receiving node for each case (e.g. no update, update LVID, and/or update object content).

In the first case, S1 is equal to S2 and LLC1 is equal to LLC2. The first case is the case in which the same version is held by both the transmitting node and the receiving node. Thus, no update is performed in this case.

In the second case, S1 is equal to S2 and LLC1 is greater than LLC2. In this case, the receiving node has a newer version of the object but the content is the same. For example, an older version may have been republished as the newer version (e.g. to revert to the older version or in response to conflicting updates to the object). Thus, no update is performed.

In the third case, S1 is equal to S2 and LLC1 is less than LLC2. In this case, the receiving node has an older version of the object but the content is the same. Since the content is the same, it is not updated. The LVID is updated to the message VID. This case may occur, for example, if a node is down when a version is published and then retracted by republishing the older version.

In the fourth case, S1 is not equal to S2 and LLC1 is equal to LLC2. That is, two versions have been published at the same logical clock time, and they may conflict since the hash digests are not the same. One version is selected. In one embodiment, the hash digest which is numerically larger is selected as the version. Thus, if S2 is greater than S1, the receiving node updates the LVID and the content of the object. If S1 is greater than S2, no update is performed. In addition, in some embodiments, conflict resolution may be performed. Any conflict detection/resolution algorithm may be used. For example, in one embodiment, the version tree of the message version may be traced (e.g. by recursively requesting information from other nodes on the parent version ID in the version descriptor for the message version and the parent version ID in the parents of the message version) to determine if the message version is a descendent of the local version. If conflict resolutions are noted in the version tree, both the resolved version path and the parent version path may be traced. If the message version is not a descendent of the local version, then a conflict may be detected and resolved. The winning version may be republished as a new version, with the winning version ID as the parent version ID and the losing version ID as the resolved version ID, as described above.

In the fifth case, S1 is not equal to S2 and LLC1 is greater than LLC2. In this case, the transmitting node has an older version of the object. No update is performed.

In the sixth case, S1 is not equal to S2 and LLC1 is less than LLC2. In this case, the transmitting node has a newer version of the object. The receiving node updates the LVID and the content of the object to the new version. Additionally, conflict detection and resolution may be performed in some embodiments, similar to the above discussion for the fourth case.

FIG. 7 is a flowchart illustrating operation of one embodiment of the object version management software 18 to transmit a message in a node 12. The object version management software 18 inserts one or more LVIDs from the node 12 as the message VIDs 66A-66B in the message 60, and more particularly in the header 62 (block 80). The object version management software 18 (or alternatively other software in the node 12) assembles the message header and the message body (block 82) and transmits the message (block 84).

Figure 8:
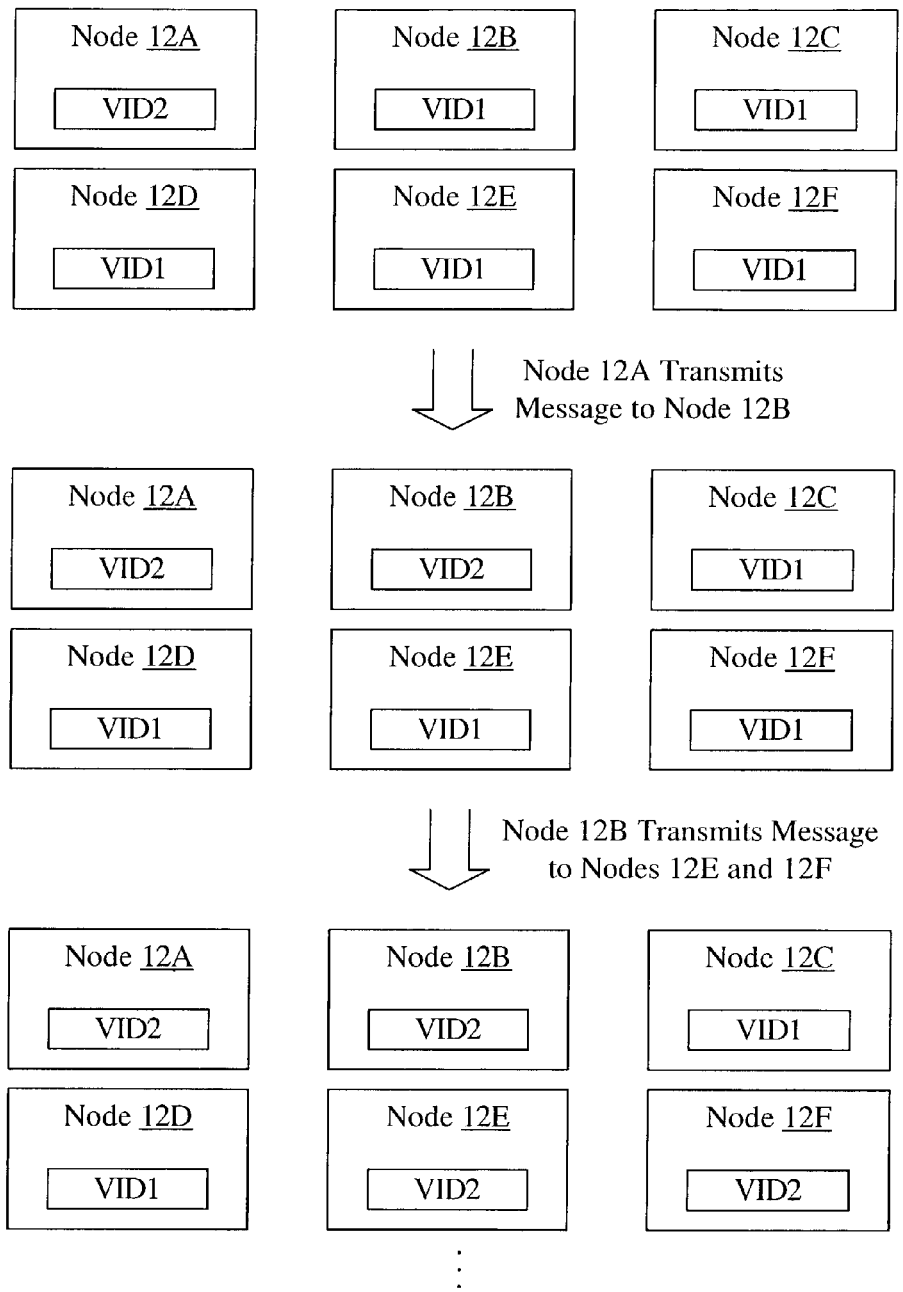
FIG. 8 is an example of a new version propagating to various nodes.

FIG. 8 is a block diagram illustrating the propagation of a new version of an object to various nodes according to one embodiment of the system 10 and the object version management software 18. Time progresses in FIG. 8 from the top to the bottom. At the top of FIG. 8, the nodes 12A-12F are illustrated. Each node 12A-12F has a version of an object. The version in the node 12A (identified by VID2) is a newer version than the version in the remaining nodes (identified by VID1) for this example.

The node 12A transmits a message to the node 12B, including the version ID VID2. The node 12B receives the message, and compares the version ID VID2 from the message to the version ID VID1 in the node 12B. Detecting that the version corresponding to VID2 is newer than the version in the node 12B, the node 12B upgrades to the newer version. The updated state of the nodes 12A-12B is shown in the center of FIG. 8.

The node 12B, subsequent to upgrading to the new version of the object, begins including the new version ID in messages it transmits. For example, the node 12B may transmit messages to nodes 12E and 12F. The messages include the version ID VID2. Each of the nodes 12E and 12F detects that the version corresponding to VID2 is newer than the version in the nodes 12E and 12F in response to receiving the message from the node 12B, and upgrades to the newer version. Thus, the updated state (at the bottom of FIG. 8) includes nodes 12A-12B and 12E-12F having upgraded to the new version indicated by VID2.

It is noted that messages from the non-upgraded nodes may be transmitted during the time period shown in FIG. 8, and these messages may not cause upgrades. For example, if node 12C transmits a message to the node 12D at the point indicated by the bottom of FIG. 8, no upgrade occurs for the object in the node 12D since the version ID inserted by the node 12C in its message is the same as the version ID in the node 12D. Similarly, if the node 12C transmits a message to the node 12A at any point indicated in FIG. 8, no upgrade occurs for the object in the node 12A since the version ID inserted by the node 12C in its message identifies an older version than that of the node 12A.

Figure 9:
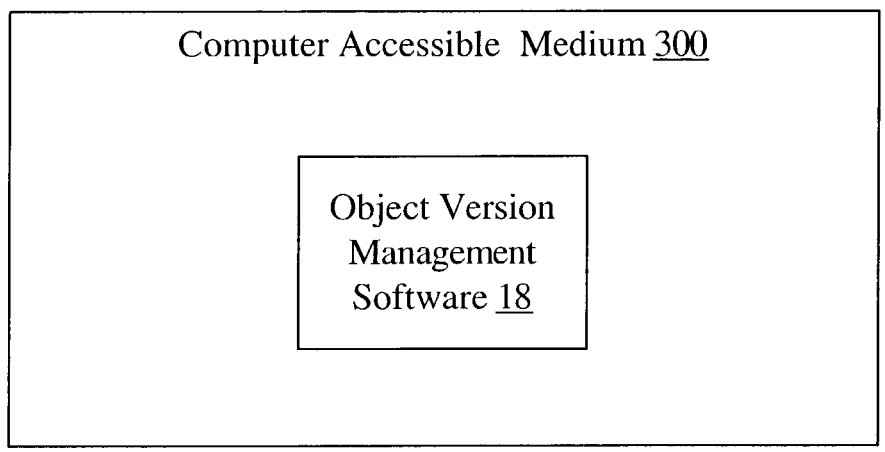
FIG. 9 is a block diagram of one embodiment of a computer accessible medium including software executable in a node.

Turning now to FIG. 9, a block diagram of a computer accessible medium 300 is shown. Generally speaking, a computer accessible medium may include storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link. The computer accessible medium 300 stores the object version management software 18 (e.g., copies of which may be the object version management software 18A-18F illustrated in FIG. 1).

Numerous variations and modifications will become apparent to those skilled in the art once the above disclosure is fully appreciated. It is intended that the following claims be interpreted to embrace all such variations and modifications.

What is claimed is:

1. A method for upgrading at least one object amongst a plurality of nodes, comprising:
   propagating a message amongst a plurality of nodes, wherein the message comprises:
      a header portion containing version information regarding at least one object at a transmitting node; and
      a body portion containing message information, wherein the message information contains a substance of the message that is unrelated to the at least one object;
   comparing the version information regarding the at least one object at the transmitting node with version information regarding the at least one object at a receiving node of the plurality of nodes to determine an object to be updated at the receiving node, wherein comparing the version information comprises:
   comparing a version id for the object in the message with a local version id for the object at the receiving node; and
   comparing a logical clock timestamp for the object in the message with a logical clock timestamp for the object at the receiving node; and
   in response to the determination of the object, obtaining data from a node of the plurality of nodes to upgrade the object at the receiving node, wherein the receiving node updates a portion of the version information regarding the object in the message and generates an updated message for propagation amongst the plurality of nodes, wherein the updated message comprises the updated portion of the version information.

2. The method of claim 1, wherein comparing the version id in the message further comprises comparing a hash digest for the object in the message with a hash digest for the object at the receiving node.

3. The method of claim 2, wherein the receiving node automatically resolves a conflict between the result of the comparison of hash digests and the result of the comparison of logical clock timestamps.

4. The method of claim 1, wherein comparing the version information further comprises the receiving node automatically resolving a conflict between the version information in the message and the version information at the receiving node.

5. The method of claim 4, wherein the receiving node automatically resolving the conflict further comprises analyzing parent version information regarding the object amongst the plurality of nodes using a parent version id in the version information in the message.

6. The method of claim 5, wherein analyzing the parent version information further comprises traversing a version tree associated with a portion of the version information for the object in the message.

7. The method of claim 1 further comprising:
   updating a portion of the version information for the object at the receiving node; and
   distributing an updated message amongst the plurality of nodes, wherein the updated message comprises the updated portion of the version information for the object.

8. A method for upgrading at least one object amongst a plurality of nodes, comprising:
   propagating a message amongst a plurality of nodes, wherein the message comprises:
      a header portion containing version information regarding at least one object at a transmitting node; and
      a body portion containing message information, wherein the message information contains a substance of the message that is unrelated to the at least one object;
   determining an object to be updated at a receiving node of the plurality of nodes based on the version information in the message;
   comparing the version information in the message with version information regarding the at least one object at the receiving node;
   comparing a logical clock timestamp for the object in the message with a logical clock timestamp for the object at the receiving node; and
   upgrading the object at the receiving node using data obtained from a node of the plurality of nodes that is not the transmitting node, wherein the receiving node updates a portion of the version information for the object and generates an updated message for propagation amongst the plurality of nodes, wherein the updated message comprises the updated portion of the version information.

9. The method of claim 8, wherein comparing the version information in the message further comprises comparing a version id for the object in the message with a local version id for the object at the receiving node.

10. The method of claim 8, wherein comparing the version information further comprises the receiving node automatically resolving a conflict between the version information in the message and the version information at the receiving node.

11. The method of claim 10, wherein the receiving node automatically resolving the conflict further comprises analyzing parent version information regarding the object amongst the plurality of nodes using a parent version id in the version information in the message.

12. The method of claim 8 further comprising:
   updating version information for the object at the receiving node; and
   distributing an updated message amongst the plurality of nodes, wherein the updated message comprises the updated version information for the object.

13. A system for upgrading at least one object amongst a plurality of nodes, comprising:
   a transmitting node for propagating a message amongst a plurality of nodes, wherein the message comprises:
      a header portion containing version information regarding at least one object at a transmitting node; and
      a body portion containing message information, wherein the message information contains a substance of the message that is unrelated to the at least one object; and a receiving node for identifying an object to be updated, wherein the identifying comprises comparing the version information in the message with version information regarding the at least one object at the receiving node and comparing a logical clock timestamp for the object in the message with a logical clock timestamp for the object at the receiving node, wherein the receiving node uses data received from a node of the plurality of nodes to upgrade the object, wherein the node is not the transmitting node, and wherein the receiving node updates a portion of the version information for the object and generates an updated message for propagation amongst the plurality of nodes, wherein the updated message comprises the updated portion of the version information.

14. The system of claim 13, wherein the node comprises a server that is configured to distribute the object.

15. The system of claim 13, wherein the receiving node resolves a conflict between the version information in the message and the version information at the receiving node.

16. The system of claim 13, wherein comparing the version information in the message further comprises comparing a version id for the object in the message with a local version id for the object at the receiving node.

17. A system for upgrading at least one object amongst a plurality of nodes, comprising:
  a transmitting node for propagating a message amongst a plurality of nodes, wherein the message comprises:
  a header portion containing version information regarding at least one object at a transmitting node, wherein the version information contains a logical clock timestamp; and
  a body portion containing message information, wherein the message information contains a substance of the message that is unrelated to the at least one object; and
  a receiving node for determining an object to be updated at the receiving node based on the version information containing a logical clock timestamp in the message and subsequently obtaining data from a node of the plurality of nodes to upgrade the object, and wherein the receiving node updates a portion of the version information for the object and generates an updated message for propagation amongst the plurality of nodes, wherein the updated message comprises the updated portion of the version information.

18. The system of claim 17, wherein the receiving node updates the version information and generates an updated message for propagation amongst the plurality of nodes, wherein the updated message comprises the updated version information.

19. The system of claim 17, wherein the receiving node compares the version information in the message with version information regarding the at least one object at the receiving node.

20. The system of claim 17, wherein the version information regarding at least one object further comprises a version id for the at least one object.

* * * * *